US00RE39886E

(19) United States
(12) Reissued Patent
Wilson et al.

(10) Patent Number: US RE39,886 E
(45) **Date of Reissued Patent: *Oct. 16, 2007**

(54) BOWLING BALL RETRIEVING DEVICE

(75) Inventors: Al Lynn Wilson, Grand Blanc, MI (US); Kevin Lee Wood, Flint, MI (US); Norman Edward Morey, North Branch, MI (US)

(73) Assignee: WWM Enterprises, Inc., Grand Blanc, MI (US)

( * ) Notice: This patent is subject to a terminal disclaimer.

(21) Appl. No.: 10/684,323
(22) Filed: Oct. 10, 2003

Related U.S. Patent Documents

Reissue of:
(64) Patent No.: 6,533,673
Issued: Mar. 18, 2003
Appl. No.: 09/932,283
Filed: Aug. 17, 2001

(51) Int. Cl.
*A63D 5/02* (2006.01)

(52) U.S. Cl. ..... 473/98; 473/99; 473/106
(58) Field of Classification Search ..... 473/54, 473/73, 98, 99, 106, 110, 111
See application file for complete search history.

(56) References Cited

U.S. PATENT DOCUMENTS 4,071,240 A * 1/1978 Camilleri ..... 473/111

* cited by examiner

*Primary Examiner*—William M Pierce
(74) *Attorney, Agent, or Firm*—Flint Patent Service; Jack E. Tubbs

(57) ABSTRACT

A one piece positive contact bowling ball retriever device, having no moving parts. It is secured to the inside of the ball return wheel and circum rotates with the wheel. It has a lead finger guide designed to assist in the differentiating of pins and the ball, as the pins go their way the lead finger guide captures, guides and holds the ball in its concave radius to be lifted and deposited in one smooth continuous flowing motion for subsequent discharge into the bowling ball return. This positive contact device nether contributes to nor is it affected by slippage and drag caused by the oil and dust normally associated with automatic bowling machinery. By using this positive contact device, ball friction will no longer have to be artificially supplied by the use of temporary rubber ball kickers and the machine r.p.m.s can be reduced for longer equipment life and more economical operation. Ball retriever 1 eliminates the need for manufactures to friction compensate by operating at 36 r.p.m, this inventor suggests that the bowling machinery may now be operated at a lower r.p.m. using belt and pulley reduction, however, other speeds and means of speed reduction could also be used.

16 Claims, 3 Drawing Sheets

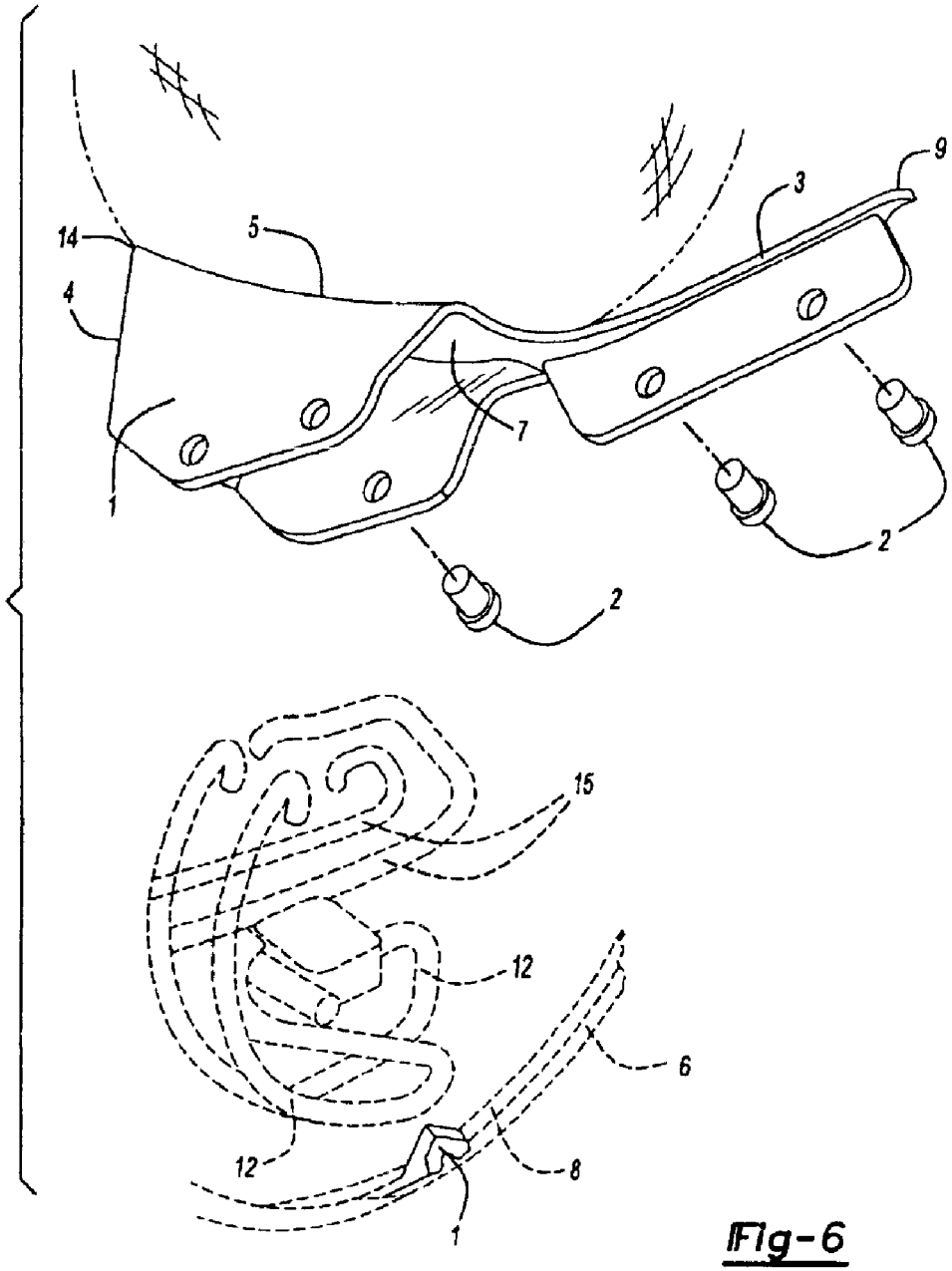
Fig-6
(AMENDED)

BOWLING BALL RETRIEVING DEVICE

Matter enclosed in heavy brackets [ ] appears in the original patent but forms no part of this reissue specification; matter printed in italics indicates the additions made by reissue.

CROSS-REFERENCES TO RELATED APPLICATIONS

None

Statement as to right to inventions made under Federally sponsored research and development:

Not applicable.

BACKGROUND OF THE INVENTION

The field of the invention is generally that of a positive contact bowling ball return device and more specifically to a convexo—concave ball retrieving apparatus so fabricated as to capture, guide, lift and deposit in one smooth continuous flowing motion, a bowling ball for subsequent discharge into a bowling ball return. In the bowling industry there are certain mechanical malfunctions directly associated with the operation of automatic bowling machinery, these problems are most commonly referred to as spinners, Yo-yos and line stoppages. It is these machinery malfunctions that constitute a meaningful overhead cost to the industry, these unnecessary problems result in a loss of revenue due to equipment downtime, bowler inconvenience, frustration, loss of customer satisfaction and the added cost for providing the personnel whose time would be better spent for other maintenance.

In reference to the Brunswick automatic pinsetter bowling machine, in particular models A and A2 which constitute a major percent of the bowling market, the bowling ball automatically finds its way for deposit onto the ball return wheel. It is at this time that the malfunction called spinning occurs. When the large static mass of a round bowling ball, excess oil on the ball and a lack of friction meet a continuously moving ball return wheel, moving at approximately 36 R.P the bowling ball will take the path of least resistance and just sit there and spin. It is this same lack of friction that causes the ball to yo-yo or malfunction in another location of the ball return path The environment inherent to the operation of automatic bowling equipment is naturally oily, dirty and subject to electrostatics which act in convert to attract even more dirt, it is this oil and dirt that introduces slippage and drag and acts as a deterrent to maintaining a constant friction for a smooth, efficient, trouble free and timely bowling ball return. It will be appreciated by those skilled in the art that to insure that a large mass bowling ball will be return routed, through automatic machinery without slippage or drag, requires a precise amount of applied friction.

It is an observation of this inventor that it has been indeed difficult, for manufactures, to achieve and maintain this correct amount of friction due to the constantly changing machine environment of oil and natural wear and the large mass of the ball. Prior art has superficially approached this problem of friction, mass and the phenomena of spin by applying three thin strips of carpet or belting material to the ball return wheel, held in place by adhesives and by increasing the r.p.m. of the automatic machinery. Application of this disposable ball kicker, by prior art, provides inadequate and only temporary friction as the tape very quickly again becomes saturated with oil creating a potential fire hazard, becomes ineffective and must be continuously disposed of in land fills. Typical costs to the operators for three eighteen inch strips of tape per machine, in a fifty-lane bowling alley, could be in excess of two hundred dollars per month and than must be replaced.

It will be appreciated by those skilled in the art that this one piece stand alone ball retriever device, having no moving parts, that captures, guides, lifts and deposits in one continuous flowing motion eliminates the need for disposable ball kickers and other ball return aids having moving parts.

It will be further appreciated by those skilled in the art that this one piece positive contact device will no longer require the higher machine speed of 36 R.P.M., it can now be operated at approximately ⅓ the R.P.M. thereby reducing the ball wheel revolutions, excessive wear on the guide rollers, flanges, drive belts, bearings, pulleys, reducing ball and pin damage, extend machinery life and will result in an overall energy savings. It is another observation of this inventor that the ball lift rods will no longer have to be manufactured with a rubber coating to provide friction as the lead guide finger of this device capture and holds the ball in a concave radius, applying a constant pressure against the back ball lift rod. It is a further observation of this inventor that due to the ball retriever one piece simplicity it would ultimately be incorporated into the manufactures fabrication of the ball return wheel.

SUMMARY OF THE INVENTION

The present invention is a one piece structure having no moving parts that when secured to the ball return wheel captures, guides, lifts and deposits in one smooth continuous flowing motion, a bowling ball for subsequent discharge into a bowling ball return. This positive action device provides the integrity of a constant friction against a bowling ball on its return path through automatic bowling machinery, it being impervious to slippage caused by lubricants and drag caused by dust and dirt. This device eliminates the need for disposable ball kickers and other ball return aids having moving parts and allows the automatic machinery to be operated at a lower r.p.m. thereby extending machinery lifetime and for a savings of energy.

It is an object of the invention to provide the user a device that reduces automatic bowling machinery downtime and a subsequent loss of revenue by eliminating spinners and ball hang-ups regardless of how much oil is on the ball.

It is another object of the invention to provide the user a one piece device, having no moving parts, that eliminates the need for disposable ball kickers and other ball return aids having moveable components.

It is a further object of the invention to provide the user a more environmentally friendly device that eliminates the need for the disposal of oil soaked rubber ball kickers and carpet strips into land fill areas.

It is another object of the invention to provide the user safer operation of automatic bowling machinery by eliminating a potential fire hazard posed by the presence of oil saturated kicker strips.

It is further object of the invention to provide the user a device that reduces the excessive wear on automatic bowling machinery such as bearings, guides, belts and drives by allowing the user to operate the equipment at a lower r.p.m.

It is another object of the invention to provide the user a more energy efficient operating system by allowing them to operate at a lower r.p.m.

It is a another object of the invention to provide the user a device that reduces bowling ball and pin damage by allowing them to operate at a slower r.p.m.

It is a further object of the invention to provide the user a device that helps speed bowling pins on the rear of the pit conveyor into the pin elevator thereby reducing the setup time of bowling pins.

It is a further object of the invention to provide the user a device that eliminates the expense and danger of using hazardous cleaning materials and eliminates the time required by a mechanic to clean the ball return wheel.

It is another object of the invention to provide the user a device that reduces mechanical downtime thereby saving the expense of replacing expensive bearings on rollers and pulleys.

It is a further object of the invention to provide the user a field upgrade kit to slow down the automatic bowling machinery to facilitate smoother operation and provide longer machinery lifetimes.

Further objects are implicit in the detailed descriptions which follows hereinafter (which is to be considered as exemplary of, but not specifically limiting, the present invention) and said objects will be apparent to persons skilled in the art after a careful study of the detailed descriptions which follows.

For the purpose of clarifying the nature of the present invention, one exemplary embodiment of the invention is illustrated in the hereinbelow-described figures of the accompanying drawing and is described in detail hereinafter. It is to be taken as representative of the multiple embodiments of the invention which lie within the scope of the invention.

BRIEF DESCRIPTION OF THE DRAWINGS

FIG. 6 is yet another perspective view of the bowling ball retriever.

DESCRIPTION OF THE PREFERRED EMBODIMENTS

Figure 1:
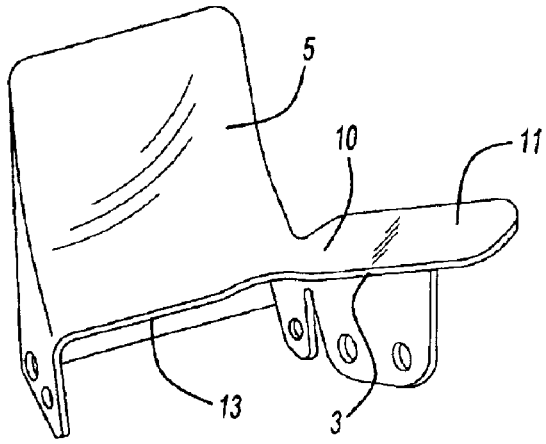
FIG. 1 is a perspective view showing one exemplary embodiment of one representative form of the invention.
Figure 2:
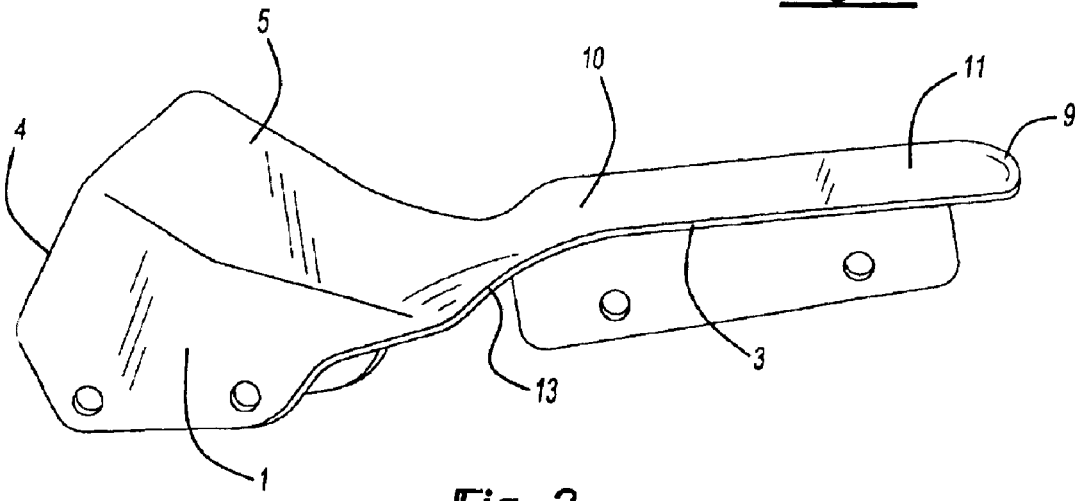
FIG. 2 is a perspective view showing one exemplary embodiment of one representative form of the invention.
Figure 3:
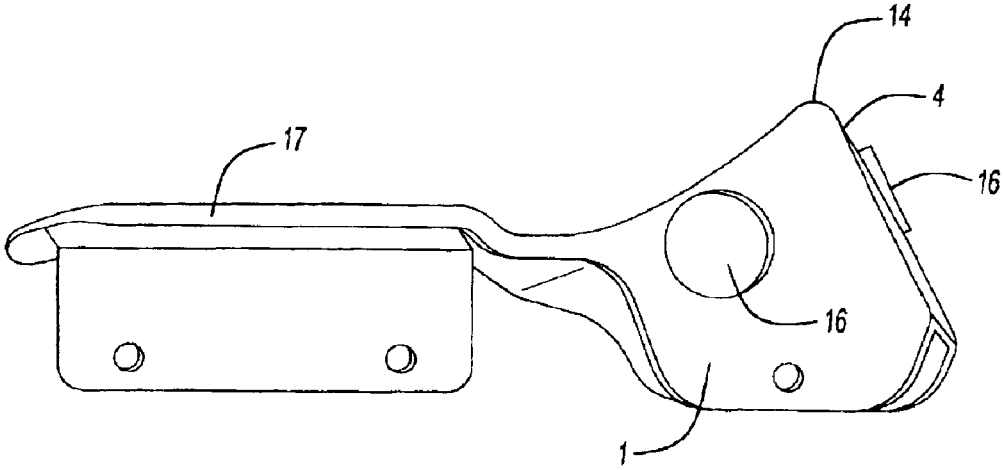
FIG. 3 is another perspective view showing one exemplary embodiment of one representative form of the invention.
Figure 4:
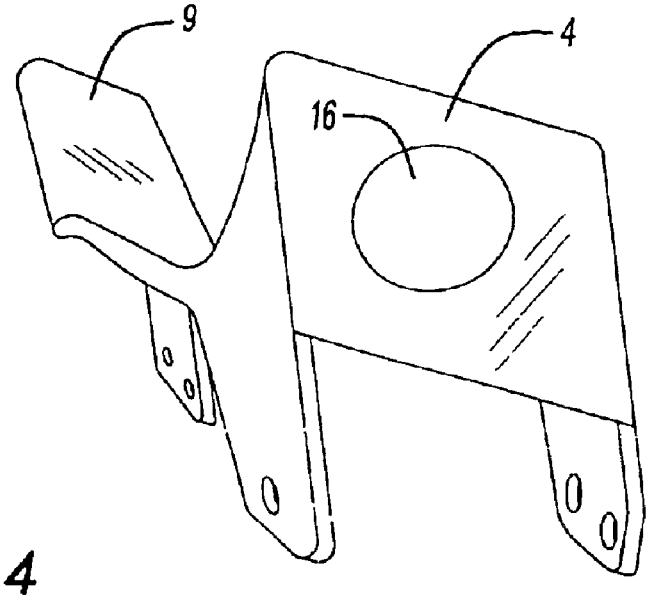
FIG. 4 is a perspective view of a bowling ball retriever.
Figure 5:
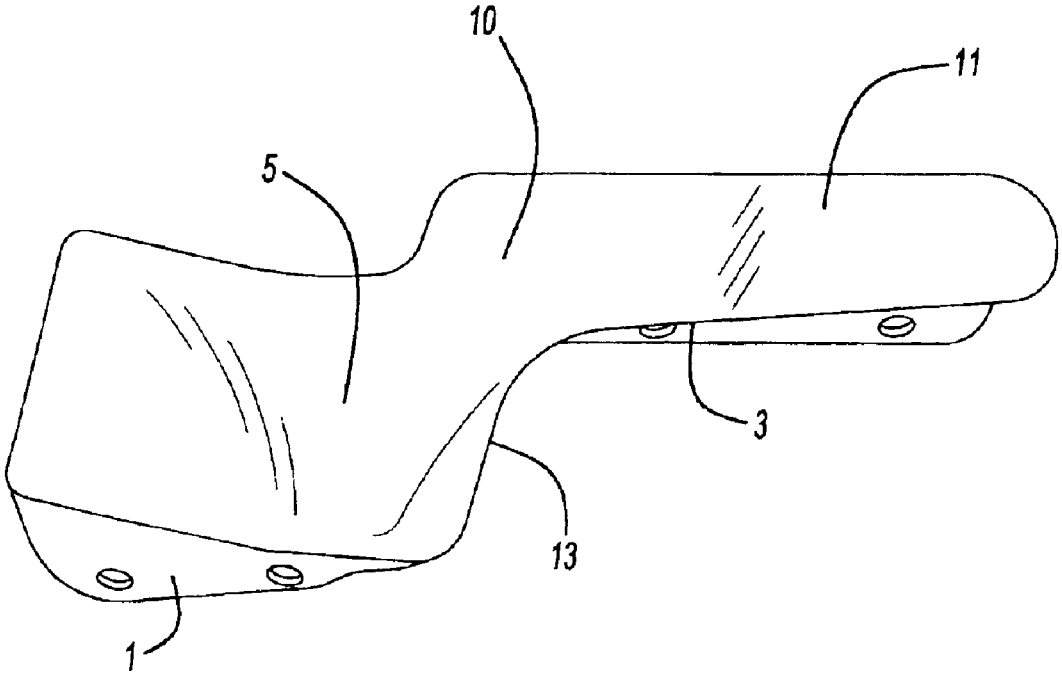
FIG. 5 is another perspective view of the bowling ball retriever.

Referring to FIG. 1. Bowling ball retriever 1 is a positive contact singularity base, that is to say, it is a one piece contact device having no moving parts. Ball retriever 1 is secured to the ball return wheel 6 with pop rivets 2, however other means of securing or fastening may also be used. The bottom 7 of ball retriever 1 is configured convex to physically comply with the inside radius of the ball return wheel 8, however that is not to say that another bottom configuration could be used if required by another form of fastening. The lead guide finger 9 of retriever 1 is designed to retrieve the ball, differentiating between ball and pin, to guide, capture and house the ball in its concave leading edge 10 for lift and delivery for subsequent discharge into a ball return. The ball, held in the radius of the lead guide finger 11 applies the correct amount of pressure against the back ball lift rod 12 eliminating the need for the rubber friction compensator. The leading edge 13 of ball retriever 1 is of a particular radius, however, other shapes or radii could also be used. The top trailing edge 14 of ball retriever 1 is of a angle for easy deposit of the ball into the ball return at the top of the ball lift, however another shape or angle could also be used. Ball retriever 1 eliminates the need for the manufacture to friction compensate the ball return system by operating at 36 r.p.m, this inventor suggests that the bowling machinery be now operated at a lower r.p.m. by using belt and pulley reduction, however, other means of speed reduction may also be used. Elongated front angled edge 3 expedites the separation of the bowling ball and bowling pins for a faster ball return system. The second angle top rear 4 facilitates easier discharge of bowling ball onto the ball return rails 15. Recess 5 secures the bowling ball for delivery to the ball return rails 15. Impact cushion 16 is attached to the impact sides of ball retriever 1 with adhesives however that is not to say that other means of fastening may also be used, the function of impact cushion 16 is to assist in diverting the ball and to lesson the stress placed on the fasteners 2 used to attach the ball retriever device 1 to the ball return wheel 6. Ball protector lip 17 insures against ball damage due to occasional high speed impact, ball protector lip 17 is shaped by the forming process of ball retriever 1, however other means of ball protection may also be used. One or more impact cushions (16) or other configurations and compositions may also be used however that is not to say that other means of bowling ball protection may also be used.

What is claimed is:

1. An automatic pinsetter bowling machine comprising;

a set of back ball lift rods (12);

a set of bowling ball return rails (15), a ball return wheel (6) for moving a bowling ball along the lift rods (12) and discharging the bowling ball into said return rails (15), a retriever device (1) secured to said wheel and including a base presenting a concave recess (5) for engaging a ball and moving the ball about said lift rods (12), said retriever device including a lead guide finger (9) disposed forwardly of said recess (5) for separating pins out of said wheel.

2. A machine as set forth in claim 1 wherein said lead guide finger (9) has a front angled edge (3) and is angled upwardly from said front angled edge (3) for guiding pins away from said wheel while guiding balls into said concave recess (5).

3. A machine as set forth in claim 2 wherein said front angled edge (3) of said lead guide finger (9) is disposed between the sides of said concave recess (5) with said concave recess (5) having a leading edge (13) adjacent said front angled edge (3).

4. A machine as set forth in claim 3 including a concave leading edge (10) extending between said leading edge (13) of said recess (5) and said lead guide finger (9).

5. A machine as set forth in claim 4 wherein said recess (5) includes a top trailing edge (14) rounded for facilitating discharge of a said ball into said return rails (15).

6. A machine as set forth in claim 5 wherein said top trailing edge (14) leads into an angled top rear (4).

7. A machine as set forth in claim 6 including an impact cushion (16) disposed on said angled top rear (4).

8. A machine as set forth in claim 2 wherein said lead guide finger (9) has a radius (11) for cradling a ball against said back ball lift rod (12).

9. A retriever device for guiding a bowling ball against a ball return rails when disposed on a ball return wheel, said device comprising;

a retriever device (1) including a base presenting a concave recess (5) for engaging a ball and moving the ball, said retriever device including a lead guide finger (9) disposed forwardly of said recess (5) for separating pins while retaining balls.

10. A machine as set forth in claim 9 wherein said lead guide finger (9) has a front angled edge (3) and is angled upwardly from said first angled edge (3) for guiding pins away while guiding balls into said concave recess (5).

11. A machine as set forth in claim 10 wherein said front angled edge (3) of said lead guide finger (9) is disposed between the sides of said concave recess (5) with said concave recess (5) having a leading edge (13) adjacent said front angled edge (3).

12. A machine as set forth in claim 11 including a concave leading edge (10) extending between said leading edge (13) of said recess (5) and said lead guide finger (9).

13. A machine as set forth in claim 12 wherein said recess (5) includes a top trailing edge (14) rounded for facilitating discharge of a said ball.

14. A machine as set forth in claim 13 wherein said top trailing edge (14) leads into an angled top rear (4).

15. A machine as set forth in claim 14 including an impact cushion (16) disposed on said angled top rear (4).

16. A machine as set forth in claim 10 wherein said lead guide finger (9) has a radius (11) for cradling a ball.

* * * * *